United States Patent
Kang

(10) Patent No.: US 8,898,486 B2
(45) Date of Patent: Nov. 25, 2014

(54) APPARATUS AND METHOD FOR CONTROLLING INPUT POWER

(75) Inventor: Min Goo Kang, Seoul (KR)

(73) Assignee: LG Electronics Inc., Seoul (KR)

(*) Notice: Subject to any disclaimer, the term of this patent is extended or adjusted under 35 U.S.C. 154(b) by 838 days.

(21) Appl. No.: 12/582,683

(22) Filed: Oct. 20, 2009

(65) Prior Publication Data

US 2010/0306558 A1 Dec. 2, 2010

(30) Foreign Application Priority Data

Jun. 1, 2009 (KR) .................. 10-2009-0048283
Aug. 26, 2009 (KR) .................. 10-2009-0079103

(51) Int. Cl.
*G06F 1/26* (2006.01)
*G06F 1/32* (2006.01)

(52) U.S. Cl.
CPC ............ *G06F 1/3203* (2013.01); *G06F 1/3296* (2013.01); *Y02B 60/1285* (2013.01); *G06F 1/26* (2013.01); *Y02B 60/32* (2013.01)
USPC ........... 713/300; 713/310; 713/320; 713/323; 713/324; 345/52; 345/211; 345/212

(58) Field of Classification Search
CPC ............ G06F 1/23; G06F 1/30; G06F 1/3203; G06F 11/1441; G06F 2212/1028; G06F 2212/1032
USPC ............ 713/300, 310, 320, 323, 324; 345/52, 345/211, 212
See application file for complete search history.

(56) References Cited

U.S. PATENT DOCUMENTS

| | | | | |
|---|---|---|---|---|
| 6,076,169 | A * | 6/2000 | Lee | 713/320 |
| 2005/0243081 | A1 * | 11/2005 | Cha et al. | 345/212 |
| 2007/0006001 | A1 * | 1/2007 | Isobe et al. | 713/300 |
| 2009/0010671 | A1 * | 1/2009 | Hashimoto | 399/88 |

* cited by examiner

*Primary Examiner* — Michael J Brown
(74) *Attorney, Agent, or Firm* — Birch, Stewart, Kolasch & Birch, LLP

(57) ABSTRACT

An apparatus and method for controlling an input power according to power management modes of a display device. In a saving mode of the power management modes, a power supply to the system is turned OFF according to an organic operation between components of the system. Thus, because the power supply to a power block within the system is turned OFF all, a consumed power is in a substantially zero state, comparable to a state in which a power plug is physically pulled out.

14 Claims, 6 Drawing Sheets

APPARATUS AND METHOD FOR CONTROLLING INPUT POWER

CROSS-REFERENCE TO RELATED APPLICATIONS

The present application claims priority under 35 U.S.C. 119 and 35 U.S.C. 365 to Korean Patent Application Nos. 10-2009-0048283 (filed on Jun. 1, 2009) and 10-2009-0079103 (filed on Aug. 26, 2009), which are hereby incorporated by references in their entireties.

BACKGROUND OF THE INVENTION

1. Field of Invention

The present disclosure relates to an apparatus and method for controlling an input power of a device.

2. Discussion of the Background

With conventional power management modes for devices or systems, the devices or systems are automatically set to a standby mode when signals to be inputted into the devices or systems are not detected within a preset time.

However, even during the standby mode, a standby power for minimally driving the devices or systems may be consumed.

Also, when the devices or systems are shifted to a power-OFF status by a user's command, because the devices or systems are powered OFF only to the standby mode, the standby power for minimally driving the devices or systems to recognize user's commands, etc., may be consumed.

Thus, in the conventional systems, to prevent standby power from being consumed, a power plug (that generally represents an AC power plug, and also, may represent a DC power plug) connected to the devices or systems must be physically pulled out. This causes inconvenience and power wasting.

SUMMARY OF THE INVENTION

Embodiments provide an apparatus and method for controlling an input power, in which substantially zero power consumption is realized during a saving mode, the saving mode being one of a plurality of power management modes.

Embodiments also provide an apparatus and method for controlling an input power, in which a saving mode is set by a user's command without physically pulling out a power plug from an outlet.

Embodiments also provide an apparatus and method for controlling an input power, in which a saving mode is set by a user by selecting whether the apparatus is to be powered OFF to a standby mode or to a saving mode when the apparatus is powered OFF.

In the standby mode that occurs due to a general power-OFF, the apparatus may be set to a saving mode when a video processor and/or converter configured to perform an output operation of a device is not operated for a preset time, for example, 2 hours.

For example, a controller may control first and second switches of a switch to switch OFF a power supplied to a system.

Embodiments also provide an apparatus and method for controlling an input power, in which each power supplied to multiple power supply blocks (e.g., a standby power supply block and a main power supply block) for selectively operating respective components within a system is interrupted according to an relative operation between a controller and switches (a first switch and a second switch).

Embodiments also provide an apparatus and method for controlling an input power, in which a first switch and a second switch are operably coupled to each other or integrally formed into a common switch part.

Embodiments also provide an apparatus and method for controlling an input power, in which a power is supplied to a corresponding power supply block to operate a system according to plural stored power management modes (e.g., a standby mode and a saving mode) when a power of the system is OFF (including the saving mode) when the system is restored (including a state in which the power is supplied, or the system is operated in the saving mode).

In one embodiment, there is an apparatus for controlling an input power in a system in which a plurality of power management modes are realized. The apparatus includes: a controller; a user command input in which a user command for setting the power management modes is inputted; a power source (unit) in which a power is supplied according to the respective power management modes set by the user command; and a switch turning OFF all input powers supplied into the power source under the control of the controller when a preset power management mode is set among the plurality of power management modes.

In another embodiment, there is a method for controlling an input power using a controller, a power source, a user command input, and a switch. The method includes: inputting a user command for setting a power management mode using the user command input; displaying at least two or more power management modes; selecting a saving mode among the power management modes; and controlling the switch under the control of the controller to turn OFF all powers supplied to a system when the saving mode is selected.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

First, the terms used herein are selected from terms that are as widely used as possible, but specific terms are arbitrarily selected by the applicant. Since operations and meanings about these specific terms will be described in detail in the detailed description of the invention, the invention should be understood through the operations and meanings of the terms instead of the general terms.

For example, an OFFAC-OFF status represents a status in which all input powers supplied to a power source (a standby power supply block and a main power supply block) are OFF to realize a zero power consumption state. Thus, the AC-OFF OFFstatus corresponds to a saving mode of the present disclosure.

A OFFDC-OFF status represents a status in which a power is not supplied to a main power supply block, but supplied to only a standby power supply block. Thus, the DC-OFF OFFstatus corresponds to a standby mode of the present disclosure.

A power-OFF mode corresponds to a power management mode of the present disclosure.

A power-OFF status represents a status that a power is not normally supplied to a display device of the present disclosure.

A power-ON status represents a status that a power is normally supplied to a display device of the present disclosure.

An AC-ON status represents a status that a power is normally applied to a display device depending ON a second switch.

To explain the technical spirit of the present disclosure, although a display device is described as an example, the present disclosure is not limited thereto. For example, the technical spirit of the present disclosure may be applicable to all devices and systems (e.g., audio devices, various players, printers, computers, etc.) that use power.

Figure 1:
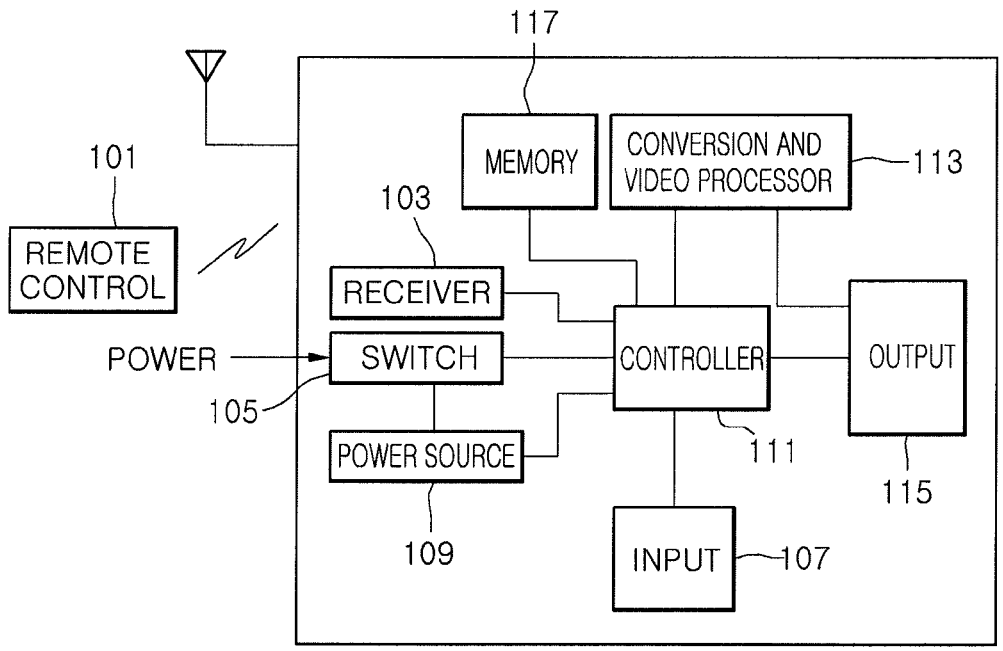
FIG. 1 is a block diagram of a display system or device according to an embodiment of the invention.

FIG. 1 is a block diagram 100 of a display system or device according to an embodiment.

As shown in FIG. 1, the system includes a remote control user command input 101 for inputting a user's command to set a plurality of power management modes, a receiver 103 for receiving the user's command, an input 107 configured to receive a local input command, a switch 105 for controlling an ON/OFF status of an input power, a power source 109 including power supply blocks (a main power supply block and a standby power supply block) for respectively supplying a corresponding power to each power management mode (e.g., saving mode or standby mode), and a controller 111 to control the switch 105 and/or the power source 109 according to the user's command or each power management mode.

In addition, the display system or apparatus includes a conversion and (video) processor 113 for performing conversion/processing operations of data received through a wireless/wired communication and an output 115 for outputting one or more of power management modes to be operated in the system, a power management mode stored in a memory 117, or the processed data.

Although the user's command is generally inputted using the remote control, the present disclosure is not limited thereto. For example, the user's command may be inputted using a previously defined key configured in the system.

A display device, display system, device or system has the same meaning in the present disclosure. Also, since the present disclosure is not limited to only the display device, an expression such as the system or device was used. That is, the present disclosure may be applicable to all other devices for controlling an input power.

Figure 2:
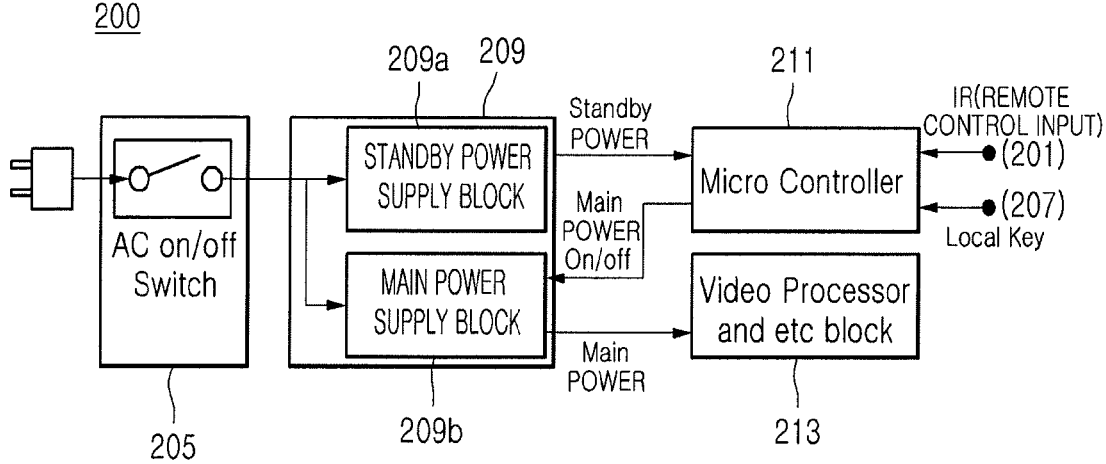
FIG. 2 is a block diagram illustrating an operation of respective power management modes depending on a power source, a controller, and a processor, which constitute a display system according to an embodiment of the invention.

FIG. 2 is a block diagram 200 illustrating an operation of respective power management modes depending ON a power source, a controller, and a processor, which constitute a display system according to an embodiment.

Referring to FIG. 2, power may be input through a power plug, e.g., through a switch 205. The power may be supplied to a standby power supply block 209a and/or a main power supply block 209b of a power source 209. This power may be supplied through a converter (not shown).

The main power supply block 209b represents a power block for applying a power to a video processor 213, and the standby power supply block 209a represents a power block for applying a power to a (micro) controller 211.

The power supply to an image processor through the main power supply block and the power supply to a controller through the standby power block are just an example. A substantial reason for dividing the components into respective blocks as described above is to show that a power of the corresponding block (e.g., the standby power supply block) can be OFF to prevent a minimal power from being consumed in the system in a state where each power management mode consumes powers different from each other.

A remote control signal 201 or a local key signal 207 corresponding to a user's command may be provided as shown in FIG. 2. When a user inputs a user command that maintains a system in a standby mode (e.g., the standby mode or a saving mode), a power of the main power supply block 209b applied to the video processor 213 is OFF under the control of the controller 211.

In this case, a standby power is supplied to the controller 211 so that the system may recognize the user command.

Figure 3:
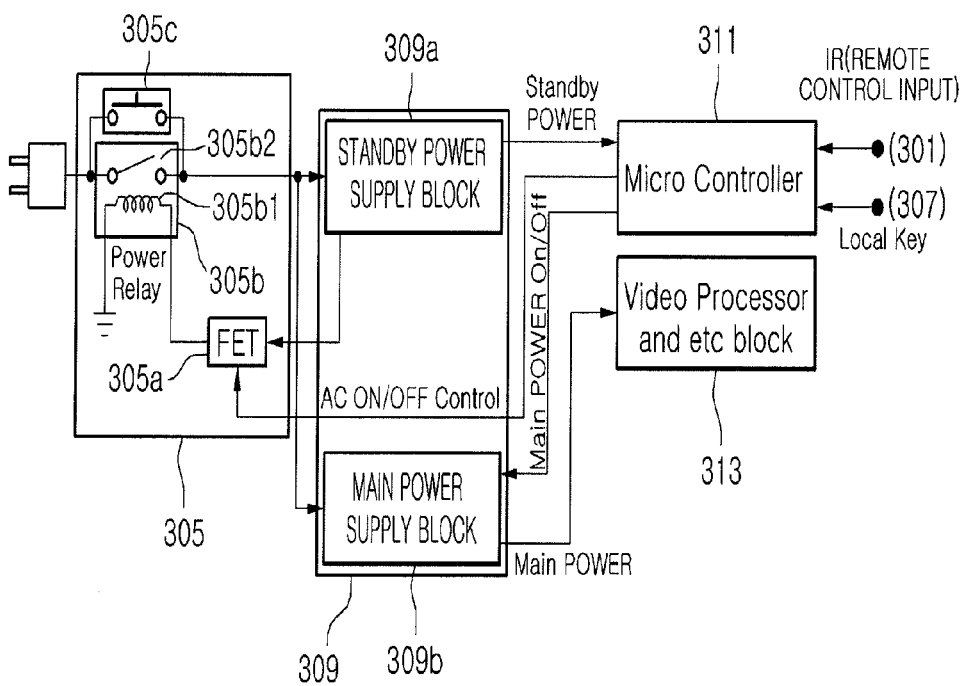
FIG. 3 is a block diagram illustrating an operation of respective power management modes depending on a power source, a controller, and a processor, which constitute a display system according to another embodiment of the invention.

FIG. 3 is a block diagram 300 illustrating an operation of respective power management modes depending ON a power source, a controller, and a processor, which constitute a display system according to another embodiment.

When characteristics described in FIG. 3 are compared to those described in FIG. 2, the most differentiating characteristics would be the fact that a switch 305 is operated by a power management mode to be set and restored under the control of a controller 311 so as to control a power supplied through a power plug.

As shown in FIG. 3, an input power supplied through a power plug, for example, an AC power is supplied through a switch 305. The power is directly or generally supplied to a standby power supply block 309a and a main power supply block 309b of a power supply block 309 through a converter (not shown).

The main power supply block 309b represents a power block for applying a power to a video processor 313, and the standby power supply block 209a represents a power block for applying a power to a (micro) controller 311, but the present disclosure is not limited thereto. According to the technical spirit of the present disclosure, a plurality of power management modes is provided to supply powers through different power lines according to the respective power management modes.

Also, a remote control signal 301 or a local key signal 307 for inputting a user's command may be provided. When a user intends to turn OFF a power, and when the standby mode (e.g., the standby mode or the saving mode) is selected, a power of the main power supply block 309 applied to the video processor 313 is OFF under the control of the controller 311.

Also, when the user intends to turn OFF a power, and when the saving mode of the plurality of power management modes (e.g., the standby mode or the saving mode) is selected, powers of the main power supply block 309b and the standby power supply block 309a are OFF under the control of the controller 311.

When the power-OFF of the system is set to the standby mode as related art and the above-described, for example, when a device is not operated for a preset time, e.g., 2 hours, a controller 311 determines whether the user command is not inputted, or the video processor and/or a converter configured for an output operation is operated to change and set the standby mode to the saving mode.

In this case, the controller 311 controls first and second switches of the switch 305 according to a set time previously stored in a memory and confirmed results of a counter (not shown) to turn OFF a power supplied to the system.

As another example, when the user command is not inputted for a preset time, the standby mode may be changed/set to the saving mode.

When the system is turned OFF in a standby mode as described above, and the user command is not inputted within a preset time, or a configuration for an output operation of the system is not operated, an operation in which the switch is controlled to operate in the saving mode may be automatically performed or performed only when set by the user.

The preset time may be variously set/changed as follows:
1) Set the preset time when a device is manufactured.
2) Set or change the present time by a user's input, and set the preset time using a user interface.
3) Set or change the preset time in a server connected to the device through a network.

Since the operation for turning OFF only the power of the main power supply block is substantially equal to the existing operation, their detail description will be omitted.

Hereinafter, an operation for realizing the saving mode of the present disclosure will be described.

A configuration and operation of the switch 305 of FIG. 3 will now be described.

Referring to FIG. 3, the switch 305 includes a first switch 305a. An output power of the standby power supply block 309a is applied to the first switch 305a, and the first switch 305a is turned ON/OFF under the control of the controller 311 to output and control the output power to High/Low.

The first switch 305a may include a field effect transistor (FET), but is not limited thereto.

An output value of the power applied from the standby power supply block 309a is controlled according to the ON/OFF operation of the first switch 305a, and a second switch 305b is controlled according to the controlled output value.

That is, an output power of the power applied from the standby power supply block 309a is turned ON/OFF by the ON/OFF operation of the first switch 305a under the control of the controller 311 to turn ON/OFF a power supplied to a display device by the second switch 305b. The second switch 305b includes a relay 305b1 operated in accordance with the output value of the standby power supply block 309a and a control command of the controller, and a switch 305b2 turned ON/OFF by an operation of the relay 305b1.

When the power supplied to the display device is turned OFF by an operation of the switch 305b2 turned to an OFF state according to an OFF operation of the relay 305b1, the display device shifts to the saving mode. Here, the input powers supplied to the standby power supply block 309a and the main power supply block 309b are turned OFF.

The second switch 305b, for example, the relay 305b1 and the switch 305b2 may be replaced with other switching units operable by an electromagnetic induction effect.

In a state where the display device is in a power-OFF status according to the operations of the first and second switches, when a power is applied to the system, a user may control a third switch 305c operably contacting the system to temporarily supply a power to the display device.

Thus, when a power is applied to the controller 311, the switch 305 is operated according to the operation of the controller 311, and the power is supplied according to the power management modes.

That is, for example, in a state where the display device is in the power saving mode, the power is temporarily supplied to the display device according to the operation of the third switch 305c, and the switch 305 is operated according to the power management modes stored in the memory and the controller 311 to supply the power.

The first switch 305a and the second switch 305b are operably connected to each other and may be integrally formed in one switch part.

The operation of the switch 305 will be additionally described below.

To realize the saving mode of the power management modes, when the user inputs a command using the remote control 301 (or the local key 307), the micro controller 311 controls the first switch 305a to control (i.e., turn OFF) current supplied to the relay 305b1.

Thus, an operation of the relay 305b1 (including an electromagnet) is turned OFF to turn OFF the switch 305b2 configured to organically operate with the relay 305b1.

Thus, since the AC power is not applied to the display device, a power is not supplied to the standby power supply block 309a and the main power supply block 309b constituting the system.

In a state where the display device is in the saving mode or the power-OFF status, when the user operates the third switch 305c (e.g., pushes a contact switch), the AC power is temporarily supplied to the standby supply block 309a and the controller 311 to control the switch 305 including the relay 305b1.

Thus, by an operation of the electromagnet of the relay 305b1, the switch 305b2 configured to operate with the relay 305b1 is turned ON by a magnetic force to supply the power through the second switch 305b.

The third switch 305c is briefly turned ON, and then, turned OFF.

The power of the standby power supply block 309a is used as the current supplied to the electromagnet of the relay 305b1. This is done because the power should be supplied to the power relay 305b1 in the standby status.

An operation of the power relay 305b1 may be controlled according to an operation of the FET that is the first switch 305a. When the current flows into the power relay 305b1, the switch 305b2 is operable. In the operation of the power relay 305b1, a contact point with the switch 305b2 is determined by whether the current flows into a coil disposed within the relay 305b1.

The operation of the switch 305 will be additionally described below.

The output power of the standby power supply block 309a is supplied to the FET 305a. Here, when the FET 305a is turned ON (a signal of the controller is applied), a power equal to that of the source is supplied to a drain of the FET, and the power flows into the coil of the power relay 305b1. Then, the contact point of the switch 305b2 is turned ON to supply the input power to respective power supply blocks 309a and 309b of the display device.

When the FET is turned OFF (the signal of the controller is not applied), since the standby power supplied to the source is not supplied to the drain, the current does not flow into the coil of the power relay 305b1.

Thus, the switch 305b2 of the power relay 305b1 is turned OFF, and the input power is not supplied to the respective power supply blocks 309a and 309b of the display device.

As described above, when the user intends to set the system in the saving mode, and when the user command (e.g., selecting the saving mode) is inputted using the remote control, the controller controls signals outputted from the FET to turn OFF the FET. Thus, because the current does not flow into the relay 305b1, and the switch 305b2 is turned OFF, the input power is not supplied to the respective power supply blocks 309a and 309b.

Thus, the system may be set to the saving mode according to the organic operation between the components of the system. Also, the system may be restored in the power management mode desired by the user using the above-described operation. That is, the set up and restoration of the power management mode may be easily realized through a software operation and a hardware configuration, but a physical action (an action for pulling out the power plug).

The operations of the switch and controller may be applicable to a case in which the system set to the standby mode is changed/set to the saving mode according to the preset time or the user command.

The operation according to the configurations of FIG. 3 will be additionally described below.

The switch 305 includes the contact switch 305c and the power relay 305b1.

The contact switch 305c is configured to temporarily supply a power in order to turn ON the display device in the saving mode.

Thereafter, the micro controller 311 controls the switch 305.

The power relay 305b1 may allow the system to be set to the saving mode by remote control. That is, the micro controller 311 controls the power relay 305b1 such that when the display device is turned ON, the power relay 305b1 is turned ON, and when the saving mode operation is required, the power relay 305b1 is turned OFF. Here, a control power of the power relay 305b1 allows the power of the standby power supply block 309a to be applied to the FET device 305a such that an operational limitation does not occur.

Also, when a command of the power management mode is received through the remote control 301, the micro controller 311 shows the command through an output (See reference numeral 115 of FIG. 1) to determine whether the user sets the system to the standby mode or the saving mode and controls the command to perform the selected power management mode.

That is, when the standby mode is performed, the micro controller 311 controls the command to turn OFF only the main power, and when the saving mode is performed, the micro controller 311 controls the command to turn OFF the main power and the power relay 305b1. A reason in which the main power is turned OFF first when the saving mode is performed is for stabilizing the system.

Figure 4:
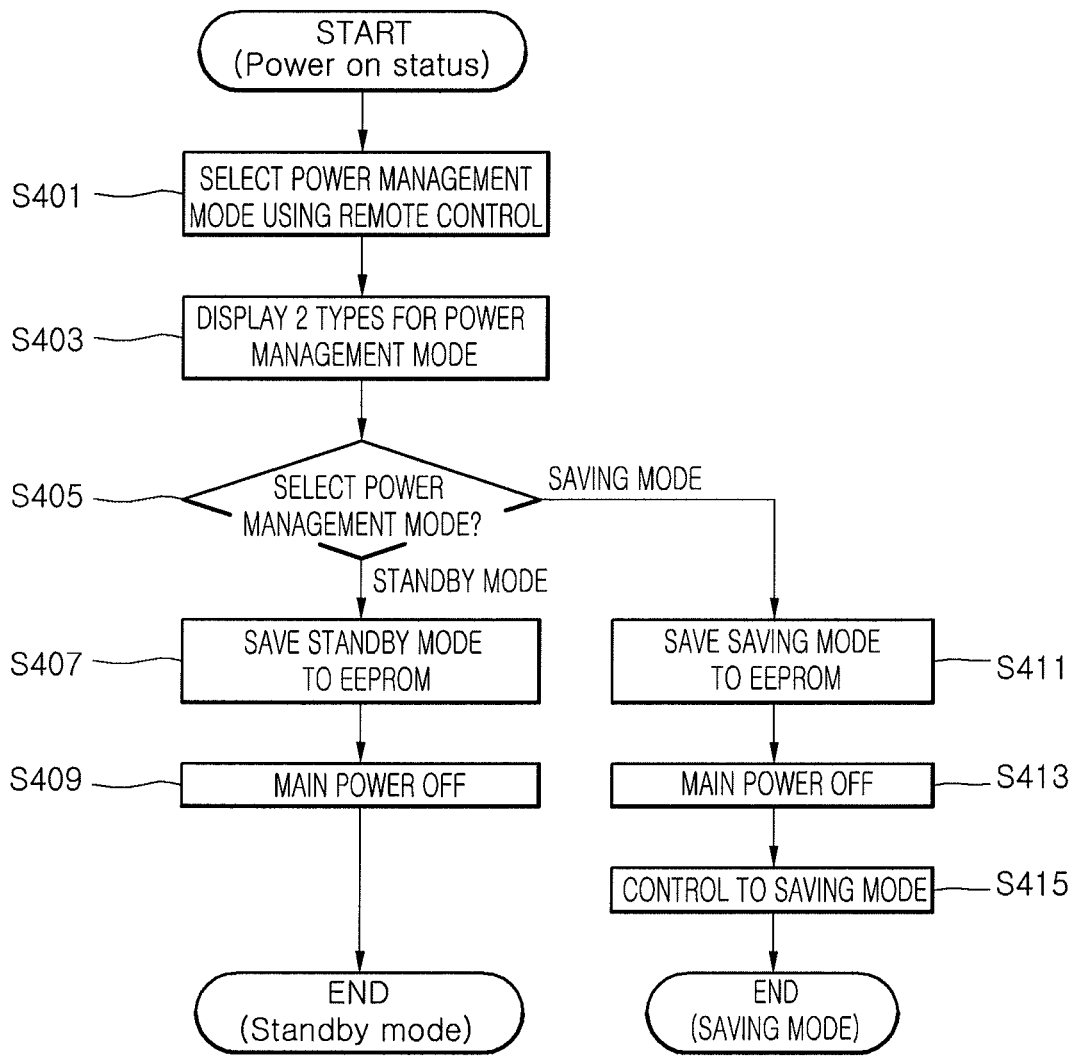
FIG. 4 is a flowchart illustrating an operation status of a system to be set to a power management mode desired by a user when the system is in a power-ON status according to an embodiment of the invention.

FIG. 4 is a flowchart 400 illustrating an operation state of a system to be set to power management modes (a standby mode and a saving mode) desired by a user when the system is operated (in a power-ON status).

Referring to FIG. 4, when a user inputs a power-OFF command or a power management mode command using a remote control in a state where a display device is turned ON in operation S401, at least two or more power-OFF modes are displayed ON an output of the display device in operation S403, and one of a standby mode and a saving mode corresponding to the two or more power-OFF modes is selected in operation S405. The power-OFF modes are displayed in a graphical menu style.

Although the user inputs the power-OFF mode command or the power management mode command using the remote control, the present disclosure is not limited thereto. For example, two command corresponding to the above-described modes may be provided, or only one command may be provided. Each case corresponds to pre-operation for setting a power management mode status desired by the user. Also, the power management mode desired by the user may be directly inputted.

In the selection process, when the standby mode is selected, a controller stores the standby mode status in an EEPROM (referring to FIG. 1) that is a memory in operation S407 and turns OFF only a main power of a power source in operation S409. Here, the display device becomes in a standby status (a standby power consumption status).

When the user selects the saving mode, the controller stores the saving mode status in the EEPROM that is the memory and turns OFF the main power of the power source and a power relay of a switch to perform the saving mode. Here, a state of the display device becomes similar to that in which a power plug is pulled out in operations S411, S413, and S415 (a standby power is zero status).

A reason why the main power of the power source is turned OFF before the power relay is turned OFF is to stabilize the system. That is, when the relay is turned OFF, all powers supplied to the system are suddenly turned OFF. Thus, this is done to protect components operated by the main power in which a relative large amount of powers is used.

Figure 5:
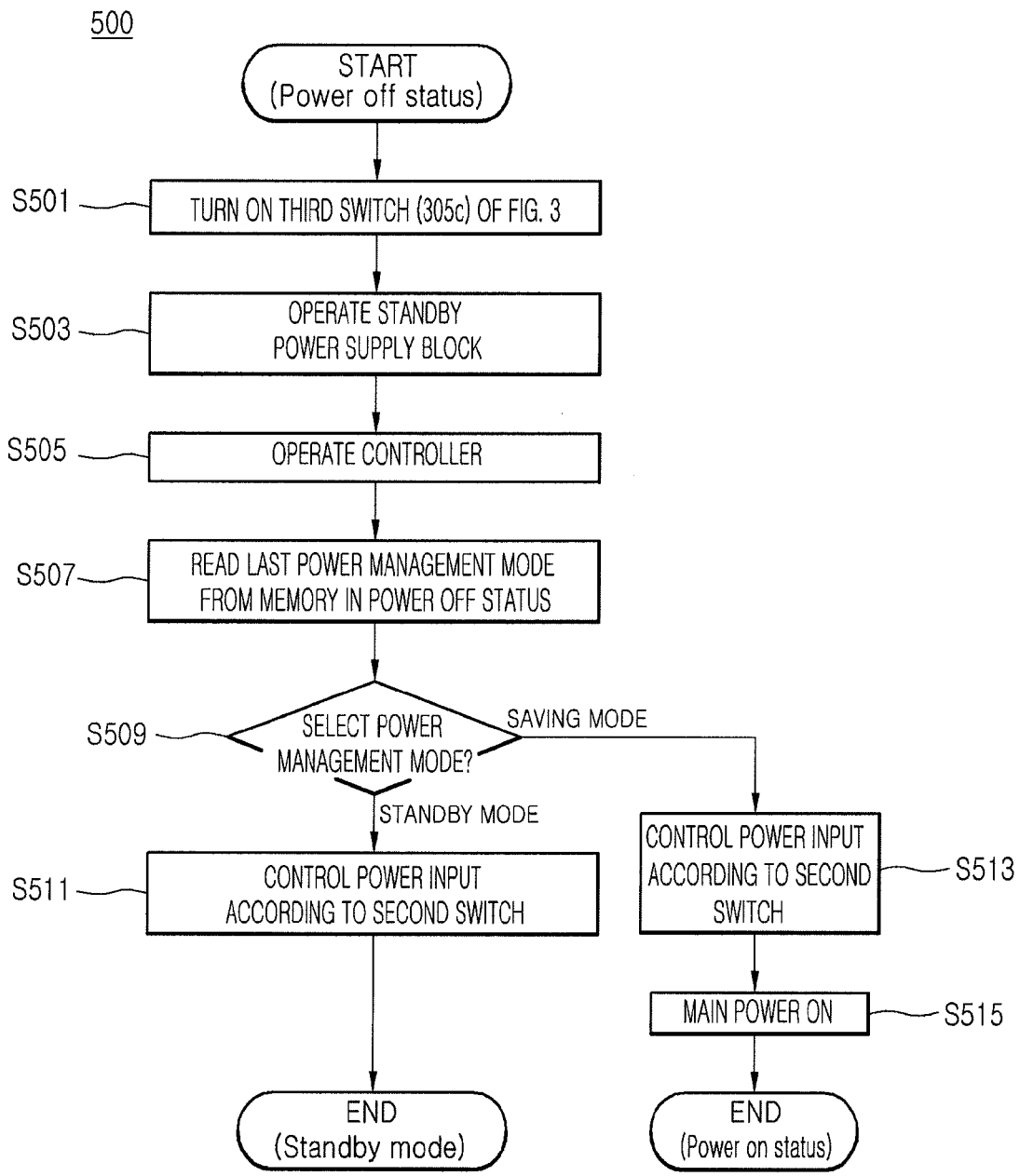
FIG. 5 is a flowchart illustrating an operation status of a display system to be set to a power management mode desired by a user when the display system is in a power-OFF status according to an embodiment of the invention.

FIG. 5 is a flowchart 500 illustrating an operation status of a display system to be set to power management modes (a standby mode and a saving mode) desired by a user when the display system is not operated (in a power-OFF status).

Referring to FIG. 5, when a user inputs a power-ON command through a contact switch that is the third switch 305c of FIG. 3 in a state where a display device is turned OFF, a standby power block 309a of the display device is operated, and a power is supplied to a controller 311 through the standby power block in operations S501, S503, and S505.

The controller receives the power, and simultaneously, reads data of an EEPROM memory in which a last power-OFF mode is stored to perform an operation according to the last power-OFF mode in operations S507 and 509.

When the last power-OFF mode is in the standby mode, the controller turns ON only an AC power (a power is applied according to the second switch of FIG. 3) to turn ON the power relay, and thus, the display device becomes in a standby status in operation S511. Thereafter, the user may turn ON the display device using a remote control.

When the last power-OFF mode is in the saving mode, the controller turns ON the AC power to turn ON the power relay. Thereafter, the controller turns ON a main power to automatically turn ON the display device in operations S513 and 515.

Figure 6:
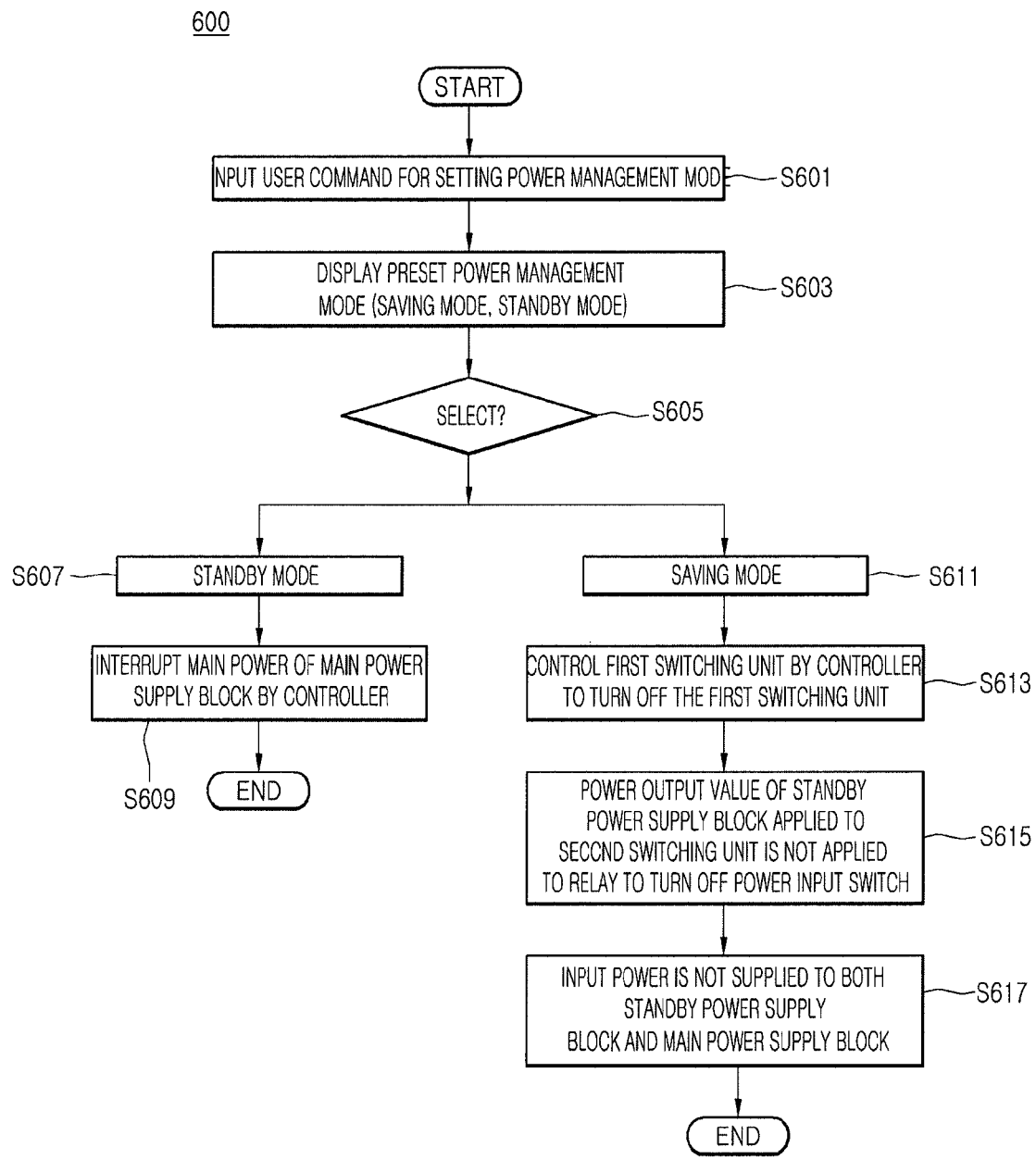
FIG. 6 is an operational flowchart related to FIG. 4.
Figure 7:
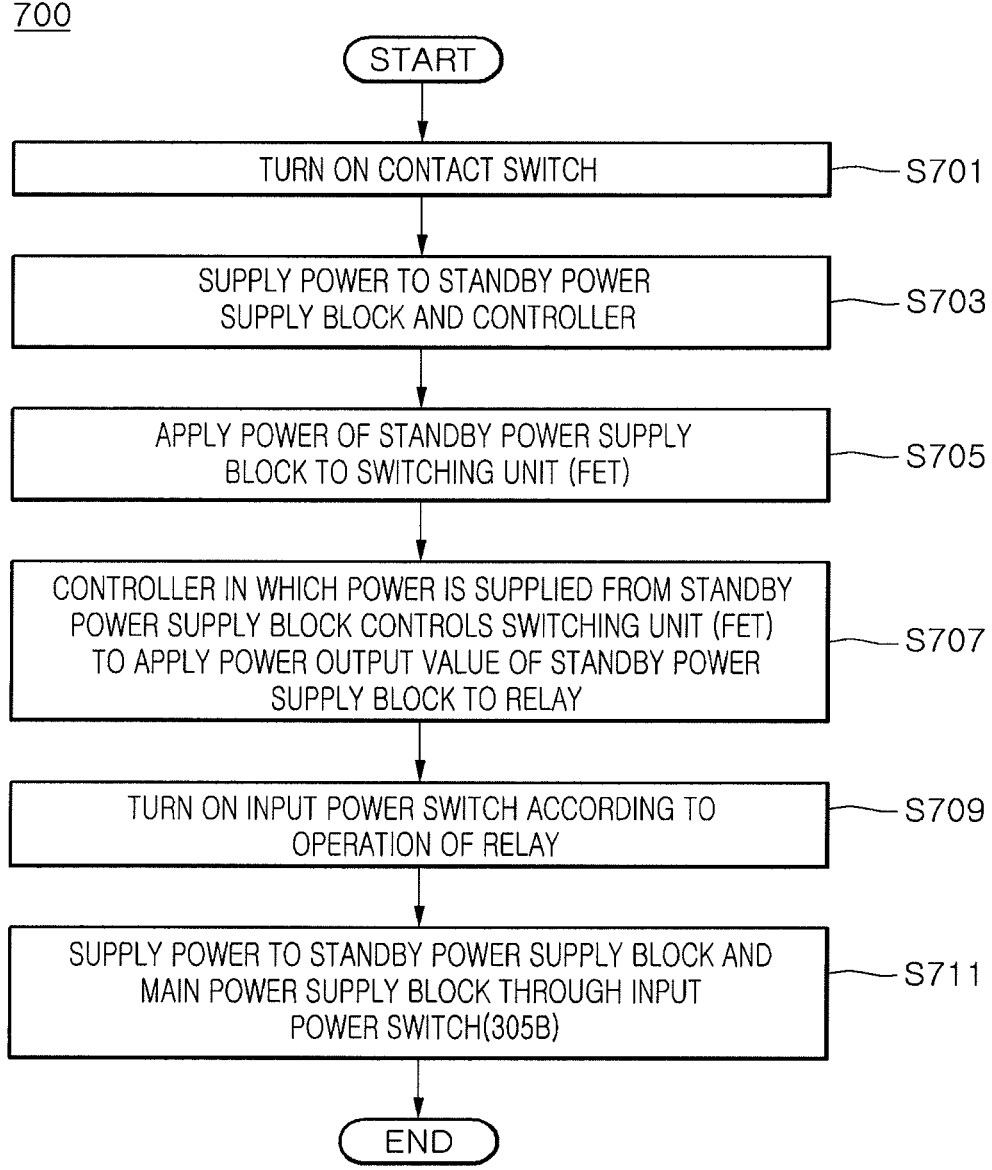
FIG. 7 is an operational flowchart related to FIG. 5.

FIG. 6 is an operational flowchart 600 related to FIG. 4, and FIG. 7 is an operational flowchart 700 related to FIG. 5. FIGS. 6 and 7 are views illustrating specific operations of a switch in order to turn ON/OFF an input power supplied to a system.

Referring to FIG. 6, in operation S601, a user command for setting power management modes is inputted in a state where a power is being supplied.

When the user command is inputted, preset power management modes (a standby mode and a saving mode) are displayed like a graphical menu in operation S603.

In operations S605 and 607, a power management mode desired by a user is selected from the displayed power management modes.

When the user selects the standby mode, as shown in FIG. 3, a controller 311 turns OFF an input of a main power in operation S609.

When the user selects the saving mode in operation S611, the controller controls a first switch 305a to turn OFF the first switch 305a in operation S613.

Thus, in operation S615, an output power of a standby power supply block 309a applied to the first switch is not applied to a relay 305b1 to turn OFF a power input switch 305b2.

Therefore, in operation S617, a power is not applied to a standby power supply block and a main power supply block.

Referring to FIG. 7, in operation S701, a preset power switch 305c is pushed to temporarily supply a power in a state where a power is not supplied.

In operation S703, a power is supplied to the standby power supply block 309a and the controller 311 according to an operation of the switch.

In operation S705, a power of the standby power supply block 309a is applied to the first switch 305a.

Also, the first switch 305a is controlled under the control of the controller receiving a power from the standby power supply block to input an output value of the standby power supply block into a relay 305b1 of a second switch. Thus, the input power switch 305b2 is turned ON by current flowing into the standby power supply block to supply the power to a power source 309 in operations S707, S709, and S711.

As described above, the present disclosure relates to the apparatus and method for controlling the input power of the device that uses a power, and more particularly, to a power control for easily realizing the zero power consumption state of the device during the saving mode and the set up and restoration of the preset power management mode by the organic operation between the components of the system.

Also, in a state where the power is normally supplied to the display device (the power-ON status), the power management mode of the display device is set to the standby mode status or the saving mode status according to the user command (the remote control, etc), and the power input control according to the set power management mode is realized by the organic operation between the components of the system.

Also, in a state where the power is not normally supplied to the display device (the power-OFF status), the power operation status may be easily restored in the power-ON status from the standby mode status or the saving mode status according to the stored power management mode.

The power management mode of the present disclosure may be set to the plurality of statuses (the saving mode status and the standby mode status) as an example. Here, the saving mode status represents a power management mode in which the power management control is further strongly performed when compared to the standby mode status.

Namely, the power management mode include 1) the standby mode status in which the power supply to the main power supply block for applying a power to the video processor and the converter of the display device is turned OFF, and a power is supplied to only the standby power supply block for applying a power to the controller such that only the user command (input command by the remote control or a key input) is recognized and 2) the saving mode status in which the power supply to the main power supply block and the standby power supply block is turned OFF. That is, the saving mode status is one status of the power management modes, which prevents even the power consumed through the controller in the standby mode status from being consumed to cause an effect substantially equal to that in which the power plug of the display device is physically pulled out.

Thus, according to the present disclosure, the saving mode in which the zero power consumption state can be realized according to the organic operations between the remote control, the controller, and the switch may be easily set to prevent the power from being consumed.

For example, after the user watches TV programs during the evening, many users go to bed in the standby mode of a television, but the saving mode.

Also, when the user is absent from home for a long time in the saving mode of the system or in a state in which the power plug is not pulled out, the standby power (including a state in which a power is being supplied to the controller, etc., to recognize the user command) is consumed.

Also, when the present disclosure is applied, in a case where a general power-OFF status is performed (corresponding to the standby mode), the system may be changed/set to the saving mode when the user command is not inputted during the preset time, or the main configurations (the video processor, etc) are not operated.

Thus, according to the present disclosure, the user may easily operate the system in the saving mode status, and the system may be operated in the zero power consumption state. Therefore, a lift cycle of the display device may be extended.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an input power via a controller, a display, a power supply including a main power supply block and a standby power supply block, a user command input, and a switch unit, the method comprising:
   inputting a user command for setting a power management mode via the user command input;
   displaying at least two or more power management modes on the display;
   selecting a power saving mode among the two or more power management modes in response to a user selection;
   controlling the switch unit via the controller to turn off all power supplied to a system including the controller and the standby power supply block when the power saving mode is selected; and
   when the power saving mode is performed, controlling the command to turn OFF the main power supply block before turning OFF the standby power supply block.

2. The method according to claim 1, further comprising: storing the selected power saving mode in a memory.

3. The method according to claim 1, wherein the controlling step of the switch unit under the control of the controller to turn off the all power of the system comprises:
   turning off a first switch under the control of the controller; and
   turning off a second switch to turn off the all power of the system according to an off operation of the first switch.

4. The method according to claim 3, wherein the first switch comprises a field effect transistor (FET), and a relay and a switch of the second switch are turned off according to an off output value of the FET to off-control input power of the system.

5. The method according to claim 4, wherein output power of the standby power supply block is supplied to the FET of the first switch, and the second switch is set to an off state by an output value of the FET according to a FET control of the controller.

6. The method according to claim 1, further comprising:
supplying power;
turning on the standby power supply block for the controller;
recognizing the power management mode stored in a memory according to the controller in which the power is supplied; and
supplying power corresponding to a recognized result.

7. The method according to claim 6, when the system is turned on in a state where the recognized power management mode is in a power saving mode, further comprising:
turning on a second switch according to control of a first switch by the controller;
supplying power according to an operation of the second switch;
turning on the standby power supply block; and
turning on the main power supply block.

8. An apparatus configured to control input power in accordance with a plurality of power management modes, comprising:
a power supply having a main power supply block and a standby power supply block;
a user command input device configured to receive a user input;
a display configured to display at least two or more power management modes;
a controller configured to select a power saving mode among the two or more power management modes in response to a user selection; and
a switch unit configured to control to turn off all power supplied to a system including the controller and the standby power supply block under the control of the controller when the power saving mode is selected,
wherein, when the power saving mode is performed, the controller turns off the main power supply block before turning off the standby power supply block.

9. The apparatus according to claim 8, further comprising:
a memory configured to store the selected power saving mode.

10. The apparatus according to claim 9, wherein the power supply supplies the power, the standby power supply block turns on for the controller, the controller recognizes the power management mode stored in the memory and supplies the power corresponding to a recognized result.

11. The apparatus according to claim 10, when the system is turned on in a state where the recognized power management mode is in a power saving mode,
wherein the controller controls a first switch to turn on a second switch, the power supply supplies the power according to an operation of the second switch, and the controller turns on the standby power supply block and the main power supply block.

12. The apparatus according to claim 8, wherein the switch includes a first switch and a second switch, and
wherein the controller turns off the first switch and turns off the second switch to turn off the all power of the system according to an off operation of the first switch.

13. The apparatus according to claim 12, wherein the first switch comprises a field effect transistor (FET), and a relay and a switch of the second switch are turned off according to an off output value of the FET to off-control input power of the system.

14. The apparatus according to claim 13, wherein output power of the standby power supply block is supplied to the FET of the first switch, and the second switch is set to an off state by an output value of the FET according to a FET control of the controller.

* * * * *